Aug. 4, 1964 W. A. TOTO 3,143,593
WELDING CABLE SEPARATORS, COOLANT PASSAGEWAYS, AND
TERMINAL ATTACHING MEANS
Filed Jan. 28, 1963 3 Sheets-Sheet 1
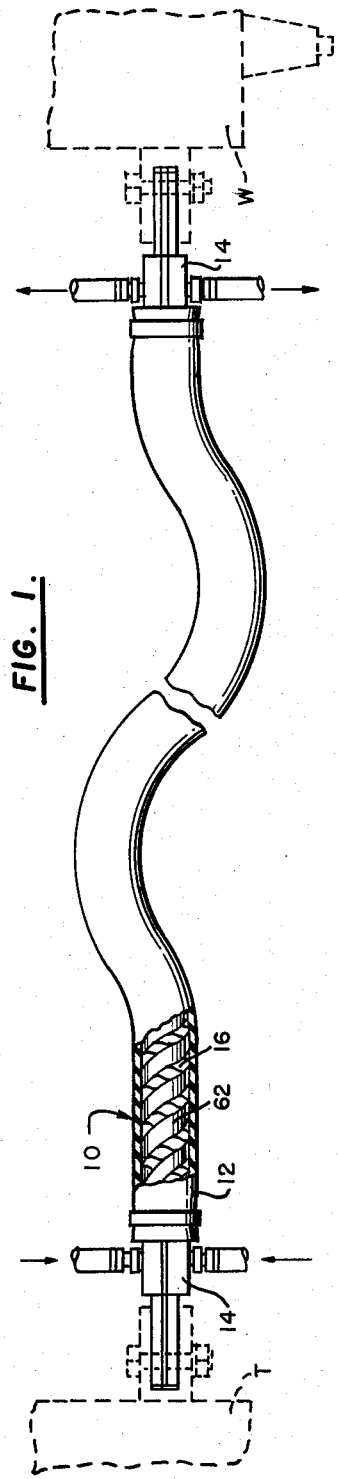
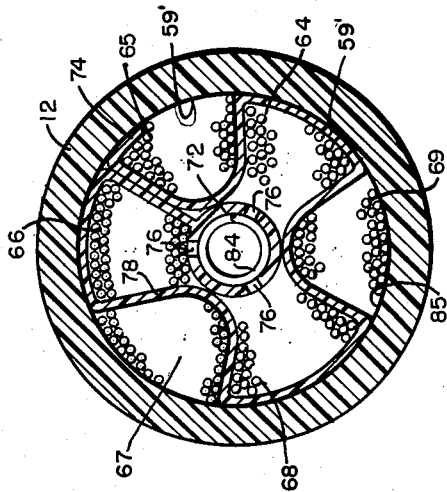
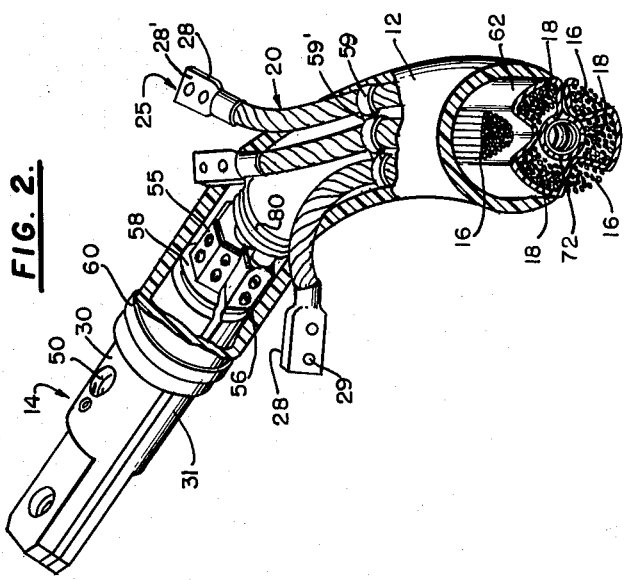
INVENTOR
William Toto
BY *Abraham A. Saffitz*
ATTORNEY Aug. 4, 1964 W. A. TOTO 3,143,593
WELDING CABLE SEPARATORS, COOLANT PASSAGEWAYS, AND
TERMINAL ATTACHING MEANS
Filed Jan. 28, 1963 3 Sheets-Sheet 2
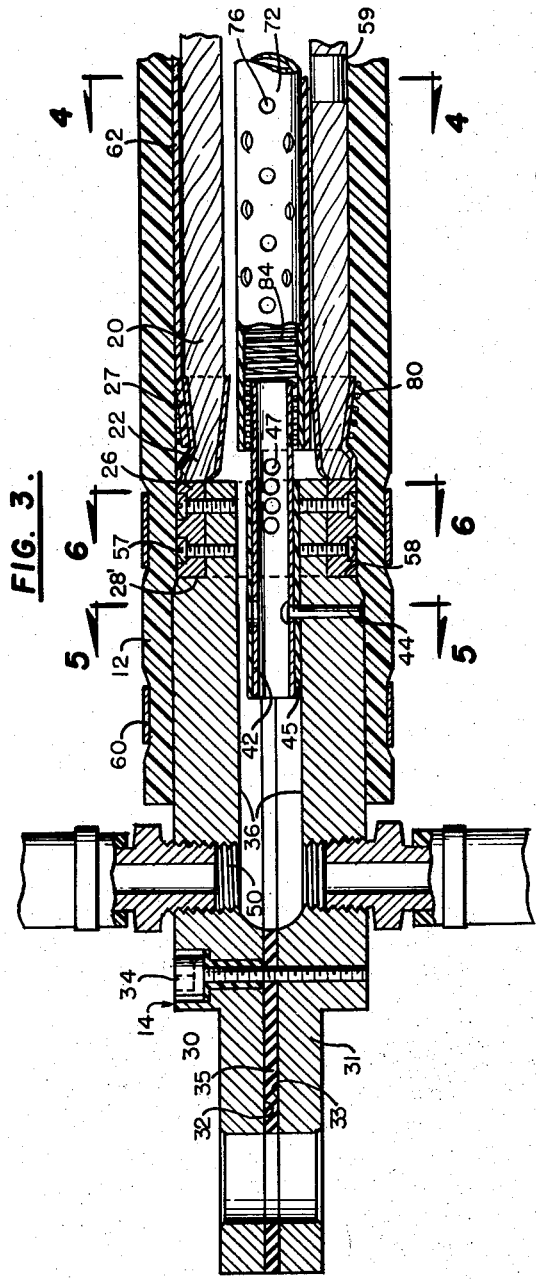
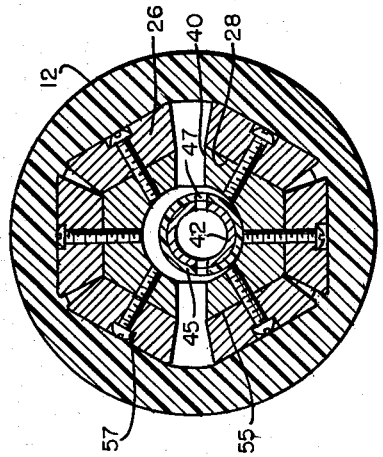
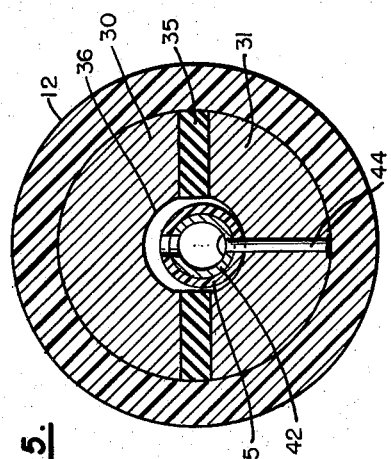
INVENTOR
William Toto
BY *Abraham A. Saffitz*
ATTORNEY

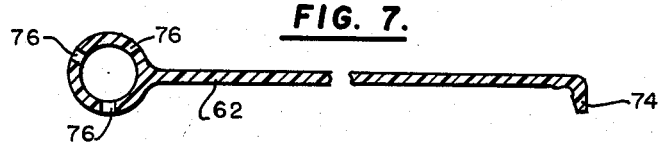
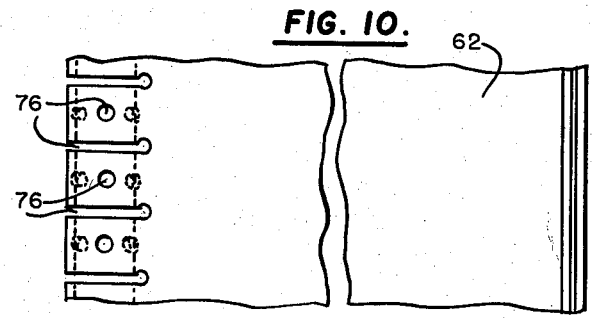
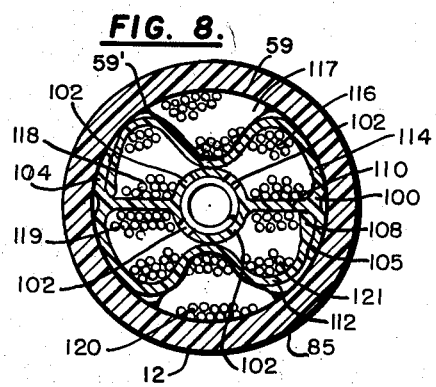
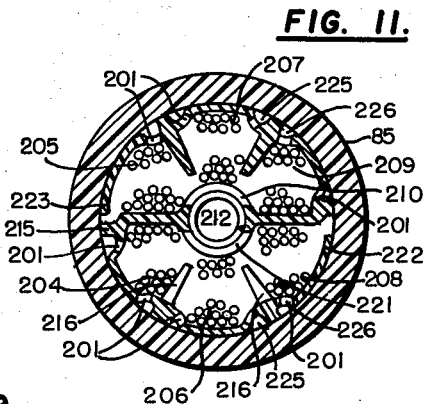
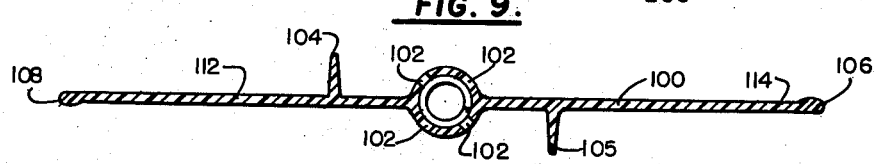
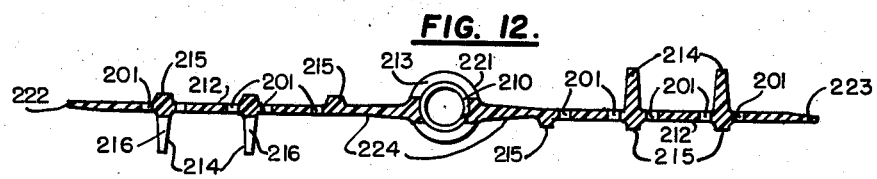

United States Patent Office 3,143,593
Patented Aug. 4, 1964

3,143,593
WELDING CABLE SEPARATORS, COOLANT PASSAGEWAYS, AND TERMINAL ATTACHING MEANS
William A. Toto, 3645 Warrensville Center Road, Cleveland 22, Ohio
Filed Jan. 28, 1963, Ser. No. 254,341
7 Claims. (Cl. 174—15)

This invention relates generally to electric cables, and in particular to welding cables.

It is an object of this invention to provide a welding cable assembly comprising two groups of cable conductors of opposite polarity and having terminal elements at its opposite ends, the individual cable conductors each being detachably secured to the terminals in an improved fashion whereby each conductor may be detached individually from the assembly, if desired, and replaced with another conductor.

It is another object of this invention to provide a welding cable assembly of the type above-referred to wherein each individual cable conductor may be independently secured to the terminal elements by means of a simple mechanical fastener, the cable to terminal joint being structurally sound and electrically efficient while being relatively smooth in outer contour.

It is still another object of this invention to provide a welding cable assembly including cable conductors separated by a continuous, one-piece insulator element all within an outer fluid impervious, resilient sheath member, the individual cable conductors each being detachably secured to terminals at opposite ends of the cable assembly in a unique, improved manner, the insulator sheet being merely folded in a unique manner about the conductors along their lengths so that when desired any individual conductor may be simply removed from the cable assembly and replaced with a new conductor without the necessity of completely disassembling the cable, or damaging the insulator sheet.

It is still further an object of this invention to provide for fluid cooling of cable assemblies of the type referred to in the above paragraph, as well as similar types disclosed in my U.S. patent application Serial No. 187,302, filed April 13, 1962, now Patent No. 3,127,467, issued March 31, 1964, with the insulator sheet being especially formed and disposed within the cable assembly to maximize efficient cooling of all the cable conductors along their entire lengths.

The basic concept of detachably securing a welding cable conductor to a terminal in a liquid cooled welding cable assembly is generally shown in U.S. Patent No. 2,480,803 issued to F. S. Wreford on August 30, 1949. The present invention provides an improvement over the basic concept as shown by the above patent and provides a novel structural arrangement of elements which was borne of necessity to solve problems which were not present with the type of cable shown in the Wreford patent, or with the type of terminal shown used in that patent. The Wreford invention involved the older type two conductor welding cable and a cumbersome, relatively complicated terminal assembly. The problems of separating the two relatively massive conductors and providing coolant flow channels along the length of the cable was solved by placing a pair of tubular non-conductive conduits between the conductor elements and extending them along the length of cable. Such structure, moreover, was readily adapted for the provision of a mechanical fastening means at each end of the conductor elements for securing the conductor elements to the terminal heads by means of a clamping plate.

However, since the Wreford invention, the six conductor, helically wound "kickless" cable has become the industry standard, and elongated split cylindrical terminals of the type shown in U.S. Patents 2,702,311 and 2,504,777, issued to Botterill et al. and Wreford et al., respectively, are finding extensive acceptance in the field. Unfortunately, such cable conductor structure is not readily adapted for simple fastening to a terminal element by means of a bolt and clamping plate as shown in the first-named Wreford patent, above. On the contrary, an approach taken in the art for attaching the conductor to the terminal can be seen in the Botterill patent whereby the ends of the cable conductors were individually secured as by soldering to individual, axially extending terminal apertures. It is entirely possible that the need for soldering the individual ends of the separate cable conductors to the terminal elements was felt because it was not apparent at this stage of development of the art how else the six conductors could be efficiently tied into the rearward end of the split terminal without serious loss of power arising from many individual connections, or without complicating the rear end structure of a basically simple and functionally desirable split cylindrical terminal.

Yet it was recognized, and is still recognized in this field that the Botterill type of terminal to conductor attachment leaves a lot to be desired from a repair and servicing standpoint. The welding cable absorbs its greatest punishment at this area due to the way in which such cables are used on the job. It is only natural that by and large the greatest number of cable failures occur at this point in the cables and, of necessity, repair and replacement costs for welding cables of this type depend largely on whether the entire cable unit must be replaced, whether the terminal elements can be salvaged from a burned out cable or whether only a single burned out cable conductor element need be replaced. Naturally, if it is possible to replace a single, burned out cable conductor when such failure occurs, this would be far more desirable than having to discard an entire cable assembly for the same failure, or to return the cable to its manufacturer for a complete overhaul, including rewinding and re-insulating.

Necessarily involved in a consideration of how conveniently a liquid cooled cable may be repaired is the type of cable conductor insulator used for separating the conductors or groups of conductors from each other and simultaneously forming the coolant flow paths along the length of the cable. As a matter of note, it will be observed that the cable insulator and coolant flow path separator shown used in Patent 2,702,311 is a tubular element closed on all sides. If a conductor element that is disposed within the cable insulator failed, in order to replace that single conductor without completely unwinding the cable unit and completely opening and laying out all of the conductors and removing the insulator element, the insulator would have to be cut open to provide access to the interior sections thereof containing the damaged cable. Obviously, such a step would be undesirable, and it may very well be the case that, in some instances, it would be more expensive to salvage and repair a cable than it would be to scrap the entire unit, even if only one conductor is burned out.

The present invention was conceived to alleviate these difficulties, and to provide a simple, low cost assembly with a minimum of complication involved of the basic, split cylindrical terminal, and which would provide for easy maintenance, and repair or replacement of any portion of the terminal or cable conductor elements, while still retaining the efficient function of all elements involved, particularly the cable insulator and coolant flow path separating element.

The foregoing and other objects, features and advantages of the invention will be apparent from the following more particular description of preferred embodiments of the invention, as illustrated in the accompanying drawings.

In the drawings:

FIGURE 1 shows a schematic view of the liquid cooled welding cable assembly in position between a transformer and welding gun.

FIGURE 2 is a perspective, partially cut away view of the end fitting area of a welding cable embodying the present invention.

FIGURE 3 is a cross sectional elevation view of the end fitting area of an embodiment of the present invention.

FIGURE 4 is a cross sectional view taken along the line 4—4 of FIGURE 3.

FIGURE 5 is a cross sectional view taken along the line 5—5 of FIGURE 3.

FIGURE 6 is a cross sectional view taken along the line 6—6 of FIGURE 3.

FIGURE 7 is a cross sectional view of a preferred embodiment of an insulating sheet member forming a part of the present invention in unfolded condition.

FIGURE 8 corresponds to FIGURE 4, and shows an alternate insulator embodiment forming a part of the present invention.

FIGURE 9 is a cross sectional view of the insulator embodiment of FIGURE 8 in unfolded condition.

FIGURE 10 is a fragmentary plan view of FIGURE 7.

FIGURE 11 is a cross sectional view of an alternate insulator embodiment forming a part of the present invention, and FIGURE 12 is a cross sectional view of the insulator embodiment of FIGURE 11 in unfolded condition.

As seen in FIGURE 1 there is shown an electrical, fluid cooled welding cable assembly generally designated by the numeral 10 and embodying the present invention. The cable assembly 10 is shown extending between a transformer T and a welding gun W, and generally comprises a flexible central conductor carrying section contained within a flexible, coolant carrying and insulating sheath or casing 12 and a pair of terminal end fittings 14 which are identical to each other for all practical purposes.

Considering the cable assembly in more detail, and referring to FIGURES 2 and 3 in particular, the cable 10 comprises two groups 16, 18 of flexible conductor elements 20, each group being of one polarity and being helically wound along the cable length to form a kickless cable similar to the cable described and claimed in U.S. Patent No. 2,320,470 issued to Rees on June 1, 1942. Each of the conductor elements 20, as shown in FIGURE 3, includes a free end portion 22 at its both extremities, and secured to the extremity as by swaging or other suitable method is provided a cable connector element 25.

Each cable connector element 25 comprises an integral forward portion 26 and a rearward portion 27. The forward portion 26 includes an inner, substantially planar surface 28 extending longitudinally and laterally with respect to the longitudinal axis of the connector element, and a substantially planar forward end surface 28'. The connector includes fastener receiving apertures 29 which extend transversely through the forward portion of the connector. The rearward portion 27 of the connector element 25 is radially offset inwardly, as shown in FIGURE 3, with respect to the forward portion for reasons that will become apparent below, and comprises a tubular element that has been crimped or swaged about the free end portion 22 of a conductor element 20.

As seen in FIGURES 2 and 3, each terminal 14 comprises a pair of semicylindrical terminal conductor elements 30 and 31 that are joined by a fastener 34 along contiguous, flat, inner surfaces 32 and 33, respectively, and in insulated relationship by means of a non-conductive element 35 which extends along the interface between the terminal conductor elements from the forward extremity of the end fitting (the left end as viewed in FIGURE 3) to a point short of the rearward extremity (the right end as viewed in FIGURE 3) as best seen in FIGURE 2. Each terminal conductor element 30, 31 is grooved axially along its inner flat surface as shown by the numerals 36 in FIGURES 3 and 5 so that when the terminal conductors are joined together to form the terminal, a central conduit is formed by the cooperating grooves, the conduit extending axially of the terminal, and terminating at the rearward extremity thereof. Of course, the insulating gasket 35 between the terminal halves is discontinued in the central conduit area; that is, the insulation material is cut away from this area so that the conduit is not split into two sections. However, as seen in FIGURE 2, since the terminal conductor flat surfaces 32 and 33 are spaced from each other, and since the insulator gasket 35 does not extend entirely to the rearward extremity of the terminal, there is left a transverse opening 40 between the rearward portion of the terminal elements which is in direct communication with the central conduit formed by grooves 36 in the terminal elements.

Disposed partially within the central conduit 36 of the terminals 14 and extending axially rearwardly therefrom, there is provided a relatively rigid tubular conduit element 42 seen best in FIGURE 3. The tube element 42 is secured within the terminal grooves 36 by a transverse pin or rivet element 44 which prevents axial movement of the tube 42. Partially surrounding the tube 42 at the rearward extremity of the grooves 36, is provided a tubular insulator segment 45 which is bonded to both the tube 42 and the conduit wall 36. Insulator segment 45 prevents the tubular elements 42, which may be conductive, from coming into contact with both terminal elements. Of course, if the tube 42 were non-conductive the need for insulation 45 would be eliminated as far as its function as an insulator is concerned. As shown in FIGURES 3 and 6, tube 42 and insulator segment 45 are provided with apertures 47 in the area of the transverse opening 40. The reason for the provision of these openings in this area will be more fully pointed out below.

As shown by the arrows in FIGURE 1, cooling liquid is adapted to be circulated through the cable embodying the present invention by admission of fluid through two ports 50 in one end fitting and discharging of the liquid from two similar ports 50 in the opposite end fitting. Assume that the terminal shown in FIGURE 3 corresponds to the terminal 14 shown to the left of FIGURE 1 and that the ports 50 are liquid inlet ports, it will be seen in FIGURE 3 that since the ports 50 both communicate directly with the central conduit 36, incoming fluid passes through ports 50, through conduit 36, into tube 42 as shown, and then divides itself between a first flow path completely within the tube 42 and a second flow path partially along the inside of tube 42, then out of tube 42 through apertures 47, and through the transverse opening 40 in a lateral and axially rearward direction. Of course, it will be apparent that if insulator segment 45 is not present, the liquid flow path in conduit 36 may divide at the forward end of tube 42 as viewed in FIGURE 3, one flow path extending along and within the tube and the other flow path passing axially along the open area outside of tube 42 between the tube and groove 36 until the transverse opening 40 is reached, at which point the flow path may include the opening area 40.

As shown in FIGURES 2 and 3, each terminal conductor element 30, 31 is undercut at its rearward end so as to provide a plurality of substantially flat connector receiving surfaces 55. The surface areas 55 lie in intersecting planes which extend substantially parallel to the longitudinal axis of the terminal elements. The surface areas each include one or more fastener receiving apertures 56 which preferably are threaded for receiving a screw or bolt element 57. The flat surface areas 55 all intersect a substantially flat radial wall section 58 of the terminal conductor element on which they are disposed. Thus, as seen in FIGURE 3, the cable conductors 20 may each individually be secured by a detachable fastener element 57 to the terminals 14. In such arrangement, as seen in FIGURES 3 and 6, the connector elements 25 are disposed so that the flat surface areas 28 of each is joined to a connector receiving surface 55 in abutting, conductive relationship with the surface 55. Of course, the conductors of similar polarity in one group 16 or 18 are attached to a single terminal conductor 30 or 31 of similar polarity.

In addition, as seen in FIG. 3, the forward end surface 28' of each of the connector elements 25 contacts a portion of the radial surface 58 of the terminal conductors 30, 31. It will thus be seen that a cable conductor to terminal joint is provided that is electrically extremely efficient high current loads such as re used with welding cables of this type. Moreover, the large contact area between each cable connector element and each terminal minimizes heating in this are due to current losses that would otherwise occur in a mechanical cable to terminal joint. In addition, maximum current carrying conductive material is provided at the immediate joint area, further reducing heat losses and preserving the electrical efficiency of the joint.

A suitable non-conductive harness 59, including cord connections 59', is provided to maintain the group of conductors 16 of like polarity together in relatively fixed position while the 3 conductors are making a transposition from alternate spacing to one of tangent positions as they approach the terminal connection. This yielding circumferential harness prevents the outer conductors 16 from unwinding along the spiraled length of the assembled cable.

If the conductors were loose and allowed to freely move in this area, such freedom, together with the powerful electrical repulsive forces set-up between the opposite polarity leads under heavy current loads and the mechanical flexing of the cable by the welding gun operator, would cause the cable to unravel along its length.

The sheath 12 enclosing the cable conductors as shown in FIGURE 1 also encloses the rearward section of the terminals, and is secured to each of same in a fluid tight relationship by a suitable clamp means 60. It will be apparent that because the rearward section 27 of the connector element 25 is radially offset inwardly, a relatively uniform circular cross section is maintained at the rearward end of the end fitting thereby preventing any interference that might otherwise occur in this area between the sheath casing 12 and the connector elements 25.

As shown in FIGURE 2 of the drawings, there is provided within the cable of the invention a conductor insulator or separator means 62 which is formed of suitable, sheet-like insulator material and which separates each of the conductor elements 20 of the cable from the other. At the same time, in the embodiment illustrated in FIGURE 4, there is formed, in combination with the outer sheath 12, a series of longitudinally extending cavities 64 through 69 within the cable unit 10 due to the folded configuration of insulator 62. A transverse cross sectional view of the insulator element 62 is shown in FIGURE 7 before the insulator is placed within the cable and while it is yet in unfolded condition. The insulator 62 is elongated normal to the paper in FIGURE 7, and is generally rectangular in shape, with the view of FIGURE 7 being across the shorter axis. It will be noted from FIGURES 4 and 7 that the insulator sheet 62 includes an integral conduit 72 which extend longitudinally along one edge of the insulator element, and an integral, liquid sealing surface 74 extending along its opposite edge portion. The tubular conduit 72 includes apertures 76, either holes or laterally positioned slots, along its length for reasons that will become more apparent below.

The insulator element 62 is placed in position within the cable 10 by folding the same longitudinally as shown in FIGURES 2 and 4 so as to thereby form wave-like corrugations 78 which enclose and/or separate from each other the conductor elements 20. In position within the cable, the tubular conduit 72 of the insulator is disposed substantially along the center line of the cable. At each end of the cable, the tubular conduit 72 extends over the free end of the terminal tubes conduit 42, and is secured in this position by a suitable means such as strands 80 shown in FIGURE 3 which are wrapped about the end of the insulator in this area to hold it in place with respect to the rearward portions of the connector elements 28. Secured by means of threads cut on the outside diameter of the tube and extending from the rearward end of each tube 42 is a suitable coil spring means 84 which extends along the length of and within the conduit 72 of the insulator element 62.

Also, when the insulator 62 is folded and in position within the cable, the sealing surface 74 extends along the outer periphery of the cable-insulator assembly and engages the inner wall 85 of the casing 12 along its length in fluid tight relationship so that liquid coolant circulating along the cable length is substantially prevented from flowing between the surface 74 and the inner surface 85 of the casing 12.

Circulation of coolant is as follows:

Cooling liquid enters one of the terminal end fittings through ports 50. Flow of this fluid continues into tube 42 and then divides; part of the flow continues within tube 42 and into the conduit 72 of the insulator 62; the other part leaves tube 42 through apertures 47 in the tube provided for this purpose, passes through the area 40 shown in FIGURE 6 at the rear extremity of the terminal, and continues along the cable within the casing 12. From FIGURE 4 it will be apparent that flow of coolant along the cable is now divided into two flow paths, one within the insulator element 62 and within the cavities 64, 66 and 68, the other being outside the insulator element and within the cavities 65, 67 and 69. It will be seen that the sealng surface 74 serves to prevent cross circulation between these two flow paths along the length of the cable.

The spring element 84 extending the length of the insulator conduit 72 not only serves to prevent the conduit from collapsing, but also serves as a resistance to axial flow of coolant to thereby urge the same radially out through the apertures 76 and into the inner flow path within the cavities 65, 67 and 69. The spring is optional, and may be dispensed with if the conduit 72 is sufficiently rigid so as not to collapse between the conductors.

Flow turbulence is caused by coolant passing over the intermittent and uneven surfaces of the loosely wound spring, and through the apertures 76. This turbulent coolant flow provides many regions of counter circular flows analogous to electrical eddy currents between adjacent apertures or slots 76. A high degree of flow turbulence about the core area greatly increases the overall heat transfer coefficients, thereby improving the efficiency of the core coolant passageways. At the same time, since the coils of the spring 84 partially block all the apertures 76 of the conduit 72, they serve to regulate the rate of flow from these apertures so as to insure a uniform circulation of coolant from all apertures along the length of the insulator.

It is to be understood that other variations of insulator winding about the conductors is fully contemplated as being within the scope of this invention. For example, as shown in FIGURE 4, the insulator 62 is longitudinally folded so that one group of conductors of identical polarity is enclosed by the insulation material within cavities 65, 67 and 69 which is also one flow path for coolant liquid. The other group of conductors of opposite polarity is disposed in cavities 64, 66 and 68 which form the second coolant flow path within the cable 12. However, although not shown, the insulator 62 could be folded so as to insulate and separate a cable arrangement wherein the positive conductors would be disposed side-by-side on one side of the cable interior and the negative conductors would be disposed together on the opposite side therefrom. In practice, the cable winding of FIGURE 4 is termed "alternate wound" and the cable winding just mentioned above is termed "opposed wound." The opposed wound configurated (not shown) involves only a slightly different flow path arrangement from that described in connection with FIGURE 3, and apertures would be provided in the insulator sheet to allow proper distribution of coolant between cavities formed by the insulation and casing walls.

Also not shown, but considered as being within the scope of the present invention, is the provision of an inner coolant conduit not integral with insulator element 62. In this arrangement, suitable sealing means such as 74 would be provided at the opposite free edges of the insulator 62 to prevent cross circulation of coolant between inner and outer flow paths within the cable, or the free edges could be interlocked frictionally at the area 74 in FIGURE 4.

An alternative embodiment 100 of insulator element 100 is shown in FIGURES 8 and 9. A cross sectional view of the insulator element 100 is shown in FIGURE 9. Insulator 100 corresponds generally to insulator 62 discussed above in that insulator 100 is also generally rectangular in form with the length thereof being substantially the same as that of the cable into which it is to be installed. The insulator 100, however, comprises a centrally disposed tubular conduit 102 which is integral with the insulator element, two transversely extending locking tab elements 104 and 105 which extend in opposite directions from the insulator element, one tab being on each side thereof, and free side edge portions 106 and 108 which may be slightly enlarged as shown in the drawings.

When installed, the central portion 110 of the insulator sheet 100 is disposed diametrically across the cable, with conductors 20 of one polarity being disposed on one side of the portion 110 and the other conductors being disposed on the other side thereof. As shown, the cable comprises a total of six conductors and three conductors are disposed on either side of the central portion 110 of insulation 100 along the cable length. The insulator sheet is longitudinally folded so that the side portions 112 and 114 of the same are folded back over the central portion 110 about the conductors in undulating fashion so as to separate each of the conductors 20 from each other, while at the same time forming coolant carrying cavities 116 through 121, inclusive, extending the length of the conductors. The free side edges 106 and 108 are locked in position between the inner wall 85 of casing 12 and an adjacent conductor 20 by means of cooperating locking tabs 104 and 105 which also tend to contain the flow of coolant passing through the cavities 116, 118, 119 and 121.

The pattern of coolant circulating through the insulator of FIGURE 8 is substantially similar to that shown in FIGURE 4; however, with the FIGURE 8 insulation one flow path comprises cavities 116, 118, 119 and 121 which communicate with the conduit 102 of the insulator, and the other flow path comprises cavities 117 and 120 which communicate with the opening 40 and apertures 47 in tube 42 in the rearward end of each of the terminals.

Another embodiment 200 of the insulator element is shown in FIGURES 11 and 12 corresponding generally to insulator 62 discussed above. It is generally rectangular in form with the length thereof being substantially the same as that of the cable around which it is to be wrapped. Through its major axis is disposed a tubular conduit 221 which is integral with the insulator element. Two pairs of transversely extending wedge elements 214 extend in opposite directions from the insulator element. One pair of elements being on each side thereof, the free side edge portions 222 and 223 of 200 are tapered to feather edges.

As seen in FIGURE 11, when assembled with the conductors, the central portion 224 of insulator sheet 200 is disposed diametrically across the interior of sheath 12 with conductors of one polarity 205, 207 and 209 being disposed on one side of the central portion 224 and the other conductors 206, 208 and 210 being disposed on the other side thereof. The cable assembly is then twisted in order to provide an even helix throughout its length. As shown, the cable comprises a total of six conductors. Three conductors are disposed on either side of the central portion 224 of insulation 200 along the length of the cable.

Side portions 212 of insulator sheet 200 are arcuately folded back over the central portion 224 in opposite directions, with the wedge elements 214 extending between and separating conductors 20 as shown in FIG. 11. The conduit 221 contains numerous apertures or laterally oriented slots 213. In the diametrically opposed wound cable construction, the spring 210 that is inserted in the conduit 221 must obviously be made from an insulating material such as nylon. This is generally supplied as a loosely wound strip ¼′ wide and .04′ thick. The nylon spring, as previously stated, provides turbulence in the core coolant flow for increased heat removing effect. Coolant flow circulating among adjacent apertures or slots 213 in "eddy current" mode efficiently accomplishes heat removal in a somewhat radial manner. To further improve heat removal particularly in the more remote and outer peripheral areas of the conductors 20, a supplementary coolant flow is introduced by turbulent flow passageways and apertures 201 located on either side of the elements 214. Ribbed standoff or spacer elements 215 are of sufficient section so that they maintain insulator sheet 200 away from the interior wall of sheath 12 for the full length of the cable in these areas and thereby provide two flow passageways on either side of spacer elements 215. Spaced slots 216 extending between the wedge separator elements 214 extend from the root of the elements 214 radially inwardly towards the inner edge of the wedge elements 214. These slots will convey coolant flow from the outer peripheral coolant passageways 225 and 226 on either side of spacer elements 215 radially inwardly towards the core conduit passageway 212. The resulting cooling action resulting from the commingling coolant flows materially reduces the temperature gradient through the cross sections of the conductors 20, and efficiently cools all the cable conductors over their entire length. The outer peripheral coolant passages 225 and 226 communicate with openings 40 and apertures 47 in tube 42 in the rearward end of each of the terminals.

It should be pointed out that in cables of this type it is of no consequence that there be inter-communicating coolant flow paths between conductors of opposed polarity. The cables are operated at such low voltage that even if water is used as the coolant, the water is essentially non-conductive at such low voltage values, and there is no danger of "shortening out" the conductors. The flow paths are formed essentially to maximize cooling effectiveness of the circulating liquid and to preserve effective flow distribution along the cable length.

A primary advantage of the present invention, particularly resulting from the detachable cable connector feature in combination with the one-piece folded insulator structure, is that either terminal may be readily separated from the cable assembly if it should be desired to replace or repair same, without the necessity for heating a solder joint, cutting off the cable conductor ends or otherwise going through a tedious process of repair as is common with other welding cables of the same general type. On the contrary, to remove either terminal from the cable assembly it is only necessary to slide the outer sheath 12 back from the rearward portion of each terminal, unfasten the cable connector fasteners, and disengage the tubular conduit 42 (if provided) from the insulator tube. In replacing the terminal the reverse procedure is followed. It will be noted that no other part of the cable assembly need be disturbed during the above operation.

Another primary advantage of the present invention arising from the detachable connector and folded insulator sheet combination is that any one or more of the cable conductor elements 20 may be removed from the cable assembly without necessitating the complete disassembly of the cable as is necessary with welding cables in general use; nor is it necessary to cut open or otherwise mutilate the insulator sheet to remove any conductor that happens to be enclosed by insulator sheet material. On the contrary, in removing and replacing any individual cable conductor, the sheath is removed from the cable by sliding it endwise therefrom. The cable assembly may then be unwound so that the conductors are essentially parallel, although this is not necessary, and the conductor to be removed and replaced is detached from the terminals at either end by removing the fastener means. The cords 80 are removed and thereafter the old conductor is simply pulled out from the assembly while its replacement is threaded back into the position of the original conductor as the replacement process progresses. It will be apparent that since the insulator is a one-piece folded sheet in all instances, any conductors enclosed within the insulator sheet can be removed without damaging the insulator sheet. Of course, the repair process may be easier with certain insulator configurations in certain instances than with insulator sheets of different configuration. However, the basic concept is the same in all cases, and any conductor may be removed from the cable assembly without removing the insulator sheet or completely disassembling the cable.

When the replacement conductor is finally in position in the cable, the cords 80 are resecured, the replacement conductor is fastened to the terminals, the sheath 12 is replaced, and the cable assembly is ready for operation.

While the invention has been particularly shown and described with reference to preferred embodiments thereof, it will be understood by those skilled in the art that various changes in form and details may be made therein without departing from the spirit and scope of the invention.

What is claimed is:

1. A flexible, welding cable assembly comprising two groups of elongated cable conductors of opposite polarity wound in helical fashion along the cable length, said conductors each having a free end portion; a flexible insulator sheet element electrically separating each of said groups of conductors from the other; cable conductor connector elements secured to each of said conductor free end portions; terminal elements at each end of said cable assembly, said terminal elements each comprising a pair of elongated, semicylindrical terminal conductor elements joined along inner, flat, mutually insulated, contiguous surfaces, each of said terminal conductor elements having a rearward portion thereof undercut so as to provide a plurality of axially extending cable connector element receiving surfaces, the forward edge of each of said surfaces intersecting the body of each of said terminal conductors at a substantially planar, radially extending surface of said terminal conductor; said connector elements having inner surfaces conforming to the shape of said connector element receiving surfaces of said terminal elements, and substantially planar forward end surfaces; each of said cable conductors of like polarity being secured at its opposite ends to a terminal conductor element of like polarity by means of said cable connector elements; each of said connector elements being conductively secured to a connector receiving surface of a terminal element by means of removable mechanical fastener means; the said forward end surfaces of each of said cable connector elements contacting a portion of said radially extending surface of each of said terminal elements; the radial thickness of said connector elements being such that when said last elements are secured to the terminal elements, the outer surface of each of said connector elements forms substantially a continuation of the outer surface of the respective terminal conductor element to which it is secured, whereby a relatively smooth, uniform, low resistance cable to terminal joint is obtained; and a tubular, removable, resilient sheath enclosing said cable conductors and extending over the rearward portion of each of said terminal elements at opposite ends of said cable assembly so as to also enclose the cable to terminal joints, whereby removal for repair or replacement of either terminal element may be effected simply by sliding back the outer cable sheath and removing the said mechanical fastener elements securing the cable to the terminal element.

2. The welding cable assembly of claim 1 wherein said insulator sheet element comprises a generally rectangular sheet-like body of non-conductive material folded along its longitudinal axis so as to extend between and along said cable conductors whereby, in addition to the terminal elements, any individual conductor element may also be removed from the cable assembly without requiring mutilation or complete removal of the insulator sheet.

3. The welding cable assembly of claim 1 wherein said insulator sheet element comprises a central section normally extending diametrically across the interior of the said cable sheath along its length, one group of conductors of like polarity being disposed on each side of said central portion of said insulator sheet, and side portions integral with said central portion, said portions being folded back arcuately in a wave pattern in opposite directions over said central portion so as to form a plurality of longitudinally extending cavities within said cable sheath, the side walls of said cavities separating the individual conductors of each of said groups from each other.

4. The welding cable assembly of claim 1 wherein said insulator sheet element comprises a generally rectangular sheet-like body of non-conductive material including a central section normally extending diametrically across the interior of said cable sheath along its length, one group of conductors of like polarity being disposed on each side of said central portion of said insulator sheet, side portions integral with said central portion, and said side portions being folded back arcuately in opposite directions over said central portions and adjacent the interior surface of said cable sheath, said side portions including radially inwardly extending separator wedge elements along their lengths, said wedge elements extending between the cable conductor elements to thereby maintain them separated from each other along the length of the cable.

5. A welding cable assembly comprising two groups of elongated cable conductors of opposite polarity, the conductors of each of said groups having free end portions; connector elements secured to the said free end portions of said cable conductors; terminal elements at each end of said cable assembly; said terminal elements each comprising a pair of mutually insulated terminal conductor elements, each terminal conductor element of said pair having cable connector receiving surfaces at its rearward portion; each of said cable conductors being removably attached at its opposite ends to a terminal conductor element of like polarity by means of said cable connector elements, each of said connector elements being secured to a connector receiving surface of the respective terminal conductor to which it is attached by mechanical fastener means; a flexible insulation sheet element for separating the said cable conductors from each other, said insulator element comprising a generally rectangular, sheet-like body of non-conductive material folded along its longitudinal axis so as to extend between and along said cable conductors and a tubular, removable, resilient sheath enclosing said cable conductors, insulation sheet, and the rearward portions of said terminal elements, said insulator sheet element further includes an integral perforated conduit means extending along its length, said conduit being normally disposed centrally along the said cable assembly, said cable assembly including liquid cooling means comprising liquid inlet and outlet ports in the terminal elements of said assembly communicating with coolant circulating means, said terminal elements further including a relatively rigid tubular conduit means extending centrally rearwardly from the rearward portion of each of said terminal elements, said conduit being in communication with said inlet and outlet ports and being directly secured in fluid tight relationship to said insulator sheet conduit and liquid coolant flow openings in the rearward portion of said terminal elements also in communication with said inlet and outlet ports, said openings being further in communication with the interior of said cable enclosing sheath whereby coolant circulating through the cable assembly is divided between said perforated, central insulator sheet conduit and the general cavity within the outer cable sheath to thereby provide efficient controlled cooling of all the conductors of said cable assembly along its entire lengths.

6. A fluid cooled, replaceable conductor, welding cable assembly comprising two groups of elongated cable conductors of opposite polarity, the conductors of said groups having free end portions; cable conductor connector elements secured to said free end portions; cable terminal elements at each end of said cable assembly, said terminal elements each comprising a pair of elongated, semicylindrical terminal conductor elements joined along flat, mutually insulated contiguous surfaces, each terminal conductor of said pair having a plurality of cable connector receiving surfaces at its rearward portion, said terminal elements furthermore including fluid circulating ports communicating with coolant circulating means; a relatively rigid tubular conduit means extending rearwardly from the rearward extremity of each of said terminal elements, said conduits communicating with said fluid ports, coolant flow openings in the rearward portion of said terminal elements, said openings also communicating with said fluid ports; each of said cable conductors being removably secured to a terminal conductor element of like polarity by means of removable fastener means securing said cable connectors to respective connector receiving surfaces of said terminal conductor elements; a tubular, removable, resilient sheath means enclosing said cable being secured to said terminal elements in fluid tight relationship; and an insulator sheet for separating said conductor groups from each other and the individual conductors of each of said groups from one another while permitting efficient coolant flow through the cable assembly, said insulator sheet comprising a flexible, generally sheet-like element folded along its longitudinal axis about said conductors so as to provide a pair of primary cavities within the said cable sheath, each cavity enclosing one of said groups of cable conductors, said insulator sheet further including an integral perforated fluid conduit disposed centrally along said cable assembly and being directly connected at its opposite ends to said tubular conduits of said terminal elements; integral, spaced, longitudinally extending wedge-like elements for separating each of said cable conductors of each of said groups in spaced apart relation; longitudinally extending, integral spacer elements for maintaining portions of the outer surface of said insulator sheet spaced apart from the interior of said cable sheath; and apertures in said insulator sheet disposed along and towards the outer edge of said spacer elements, whereby coolant flowing through said coolant flow openings in the rearward portions of said terminal elements may circulate along the space between the interior of said cable sheath and the outer surface of said insulator sheet maintained by said spacer elements, and commingle with coolant flowing through the perforated, insulator sheet conduit along the entire length of the cable assembly, and whereby any terminal element may be readily separated from the cable conductors by detaching the conductor fasteners therefrom, and any conductor element of said cable may be removed from the cable assembly and replaced with a new conductor without necessitating the complete removal or mutilation of the insulator sheet.

7. A fluid cooled, replaceable conductor, welding cable assembly comprising two groups of elongated cable conductors of opposite polarity, the conductors of said groups having free end portions; cable conductor connectors elements secured to said free end portions; cable terminal elements at each end of said cable assembly, said terminal elements each comprising a pair of elongated, semicylindrical terminal conductor elements joined along flat, mutually insulated contiguous surfaces, each terminal conductor of said pair having a plurality of cable connector receiving surfaces at its rearward portion, said terminal elements furthermore including fluid circulating ports communicating with coolant circulating means; a relatively rigid tubular conduit means extending rearwardly from the rearward extremity of each of said terminal elements, said conduits communicating with said fluid ports; coolant flow openings in the rearward portion of said terminals, said openings also communicating with said fluid ports; each of said cable conductors being removably secured to a terminal conductor element of like polarity by means of a removable fastener means securing said cable connectors to respective connector receiving surfaces of said terminal conductor elements; a tubular removable, resilient sheath means enclosing said cable being secured to said terminal elements in fluid tight relationship and an insulator sheet for separating said conductor groups from each other and the individual cable conductors of each of said groups from one another, while permitting efficient coolant flow through the cable assembly, said insulator sheet comprising a flexible rectangular, sheet-like member including a central portion extending diametrically across the interior of said sheath with one group of cable conductors disposed on either side thereof along the cable length, said central portion including an integral conduit directly connected at its opposite ends to said tubular conduits of said terminal elements, a pair of integral side portions having free edge extremities on either side of said central portion, said side portions being folded back arcuately over said central portion and adjacent the inner wall surface of said sheath; spacer elements extending longitudinally along the outer surfaces of said folded side portions, said spacer elements maintaining separation between the outer surface of said side portions and the inner wall of said casing to thereby provide coolant flow path cavities through the cable assembly adjacent the inner wall of said casing; elongated wedge elements extending radially inwardly from said folded insulator side portions and being disposed between said cable conductor elements along their length, said wedge elements being longitudinally spaced apart so as to provide coolant circulating flow paths between said wedge elements and extending inwardly from areas of said folded side portions directly opposite from said spacer elements; apertures in said folded insulator side portions adjacent said spacer and wedge elements, whereby coolant flowing through said coolant openings in the rearward portions of said terminals may circulate along the spaces provided between the interior of said sheath and the outer surfaces of said insulator sheet side portions and flow inwardly among all the cable conductors along their entire length, the last-mentioned coolant flow commingling with the flow of coolant circulating through said insulator sheet conduit whereby all cable condutcors are provided with turbulently circulating coolant over their entire lengths, and whereby any conductor element of said cable may be removed from said cable assembly when desired by detaching same from the terminals, separating it from the insulator sheet member and replacing it with a new conductor element, all without the need for completely disassembling the cable assembly nor removing or mutilating the insulator sheet, and either terminal may be separated from the cable assembly by detaching the fastener held cable conductors therefrom.

References Cited in the file of this patent

UNITED STATES PATENTS

| | | |
|---|---|---|
| 1,574,076 | Fisher | Feb. 23, 1926 |
| 2,302,839 | Burgett | Nov. 24, 1942 |
| 2,562,544 | Gleason | July 31, 1951 |
| 2,702,311 | Botterill | Feb. 15, 1955 |
| 2,879,317 | Wreford | Mar. 24, 1959 |